March 3, 1942.  J. C. CROWLEY  2,275,288
VALVE STEM
Filed April 22, 1939
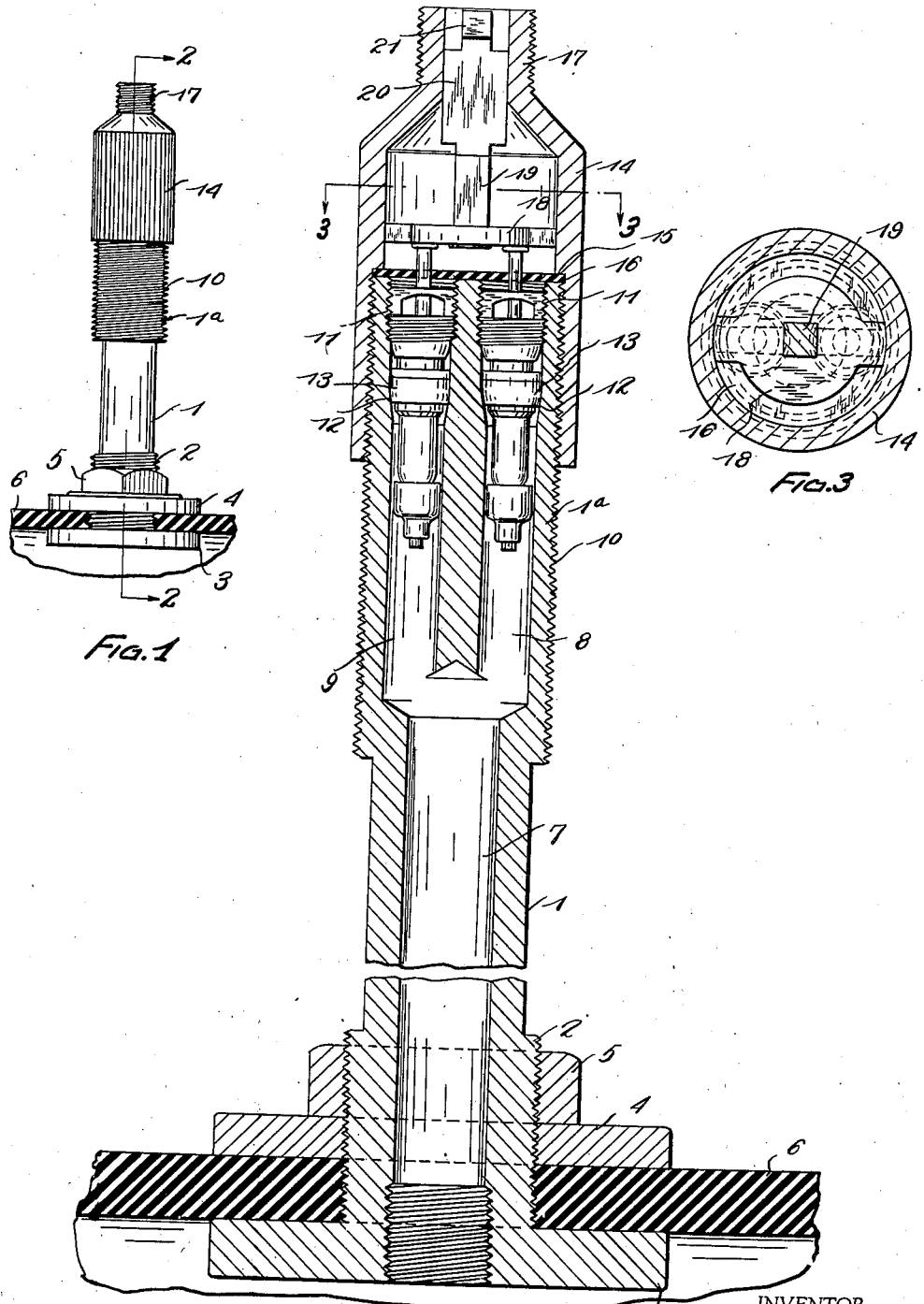
INVENTOR.
JOHN C. CROWLEY
BY
ATTORNEYS Patented Mar. 3, 1942

2,275,288

UNITED STATES PATENT OFFICE 2,275,288

VALVE STEM

John C. Crowley, Cleveland Heights, Ohio, assignor to The Dill Manufacturing Company, Cleveland, Ohio, a corporation of Ohio Application April 22, 1939, Serial No. 269,381

3 Claims. (Cl. 277—20)

The present invention relates to a valve stem which is more particularly designed to be used in connection with large size pneumatic tires or similar devices.

One of the objects of the present invention is to provide a valve stem structure which will permit the rapid passing of a large volume of air, furnished by an inflating device, through the valve stem and into the article to be inflated.

A further object is to provide a valve stem so constructed that the pneumatic article may be rapidly deflated when such is desired.

A further object of the invention is to provide a valve stem which may accommodate a plurality of passageways, each provided with its own check valve, which check valve may be simultaneously operated upon inflation and simultaneously operated upon deflation of the pneumatic tire device.

A further object of the invention is to provide a valve stem having a multiple number of check valves and in which the check valves may be simultaneously operated and air delivered through a common conduit which is of such size and shape as to accommodate the usual types of inflating devices now commonly used in connection with inflating tires and the like.

Reference should be had to the accompanying drawing forming a part of this specification and in which Fig. 1 is an elevation of the valve stem.

Fig. 2 is a sectional elevation of the valve stem upon the line 2—2 of Fig. 1, and Fig. 3 is a section upon the line 3—3 of Fig. 2.

At the present time there are in use, for certain types of traction devices, very large pneumatic tires, as an example of which we might mention a tire of 32 inches rim diameter and 13.5 inches cross sectional diameter.

These tires require an enormous amount of air to properly inflate them and when employing a valve stem fitted with the usual valve core some of these tires require as much as 28 minutes to bring them to the proper degree of inflation. A valve stem embodying the features of construction forming the subject matter of this invention may be employed to very materially reduce the time required for inflating these large pneumatic tires.

While it is desirable to provide a valve stem for use in connection with these large size pneumatic tires which will permit of rapid inflation and deflation, it is also highly desirable that the valve stem structure so provided shall be capable of being used in connection with inflating air chucks which are at present in use and thus avoid the necessity of providing a special air chuck.

The valve stem which is about to be described accomplishes the desired results in a very efficient manner.

Referring to the drawing, 1 indicates a valve stem which, at the lower portion thereof, is threaded as indicated at 2 and is provided with a head 3. The threaded portion 2 is adapted to receive a clamping member 4 and a clamping nut 5, both of which are screwed upon the threaded portion 2 for the purpose of securely retaining the valve stem with respect to the wall of the pneumatic tube 6.

The valve stem 1 has a longitudinally extending passageway 7 which, toward the upper end of the stem, cooperates with a plurality of passageways which are indicated at 8 and 9. While in the present instance two such passageways are provided, it is within the scope of this invention that a greater number than two be provided, if that is necessary.

In order to accommodate the passageways 8 and 9, the upper end of the valve stem is somewhat enlarged in diameter as indicated at 1a and is provided with threads upon at least a portion of the outer surface thereof, as indicated at 10.

Each of the passageways 8 and 9, at the outer end thereof, is threaded for a short distance, as indicated at 11, and below the threaded portion 11 there is, in each passageway, a restricted or shouldered portion 12 for a purpose which will be described later.

Each of the passageways 8 and 9, by virtue of the construction which has just been described, is adapted to receive an individual valve insides or core of any type which is at present conventional in the commercial field. Such valve insides, when screwed into the passageways 8 and 9, will have the packing 13, commonly used in connection with such cores or valve insides, moved into contact with the restricted portion 12 to thus seal the passageway against the passage of air around the valve core. All conventional valve insides or cores are provided with valve pins which are spring pressed in a manner perfectly well known and which need no description.

Threaded upon the outer end of the enlarged portion 1a of the valve stem is a hollow cap-like member 14. This member has a shoulder 15 which cooperates with a packing 16 that rests against the upper end of the portion 1a of the valve stem so that, when the portion 14 is screwed upon the end of the valve stem, it is air tight.

The member 14, at its end, converges to form a neck-like portion 17 which is of a diameter the same as that of the conventional valve stem and, therefore, is of such size as to be adapted to receive air chucks, caps, or other accouterments at present employed in the commercial field of vehicle tires and valve stems therefor.

Within the member 14 there is a spider which has a head 18 so formed as to engage with the top portions of the pins of the valve insides which are inserted in the passageways 8 and 9. This spider has an upstanding portion 19 which, toward the outer end, is fashioned as a flat slab 20 and this extends into the neck portion 17 of the member 14. This slab-like portion forms a guard for the spider but is of such dimensions as to offer no substantial impediment to the passage of air. The slab-like portion 20 has an upward extension 21 which extends practically to the outer end of the extension 17 and is in position to be engaged by a pin-depressing member which forms a part of all those conventional air chucks which are in commercial use for the purpose of inflating pneumatic tires and the like.

From the foregoing it will be seen that, with a valve stem constructed as described, when an air chuck is applied to the outer end of the stem, indicated at 17 in the drawing, the depressing member always associated with such air chuck will engage the portion 21 and depress the spider, which will in turn depress the valve pins of the valve cores or insides and open the passage through the valve insides to permit the passage of air therethrough. The air passing beyond the valve insides in the passageways 8 and 9 will unite in the passage 7 and be supplied to the pneumatic device in connection with which the stem is used.

It will be obvious that the volume of air passed in a given interval of time, employing the structure which has been heretofore described, is twice as great as that which could be supplied when using a valve stem in which there is only one valve insides. Consequently, the time required for inflating a large size tire or similar pneumatic device will be reduced to one-half of the time required at present for inflating such a device.

It will be apparent that, if desired, more than two passageways 8 and 9 could be employed which would mean, of course, the use of more than two of the usual valve cores or valve insides and thus provide additional air passage for inflation.

It will be apparent, of course, that upon desire to deflate the pneumatic device which has been previously inflated, the spider may be depressed by any suitable instrument, which will in turn open the air passages through the valve insides or core and permit deflation. However, if it is desired to more rapidly deflate such a tire this may be accomplished by removing the cap-like member 14 and removing the valve insides or cores from the channels 8 and 9, which will then, of course, permit the free exhausting of the air from the device in question.

The great advantage of the device which is herein described and claimed lies in the fact that it provides a valve stem having multiple air passageways, each controlled by its own valve core or valve insides which are at present conventional and readily accessible to users, with the resultant effect of being able to inflate the large size tires or similar pneumatic devices in much less time than valve stem equipment at present available can do. In addition, the present structure makes it possible to use, for inflating purposes, air chucks that are at present commonly used for inflating tires and thus avoids any necessity of providing special chucks or any other special paraphernalia in connection with use for inflating or deflating tires, to which reference has been made.

Obviously, changes may be made from the precise structure which is shown herein and these are regarded as within the scope of the present invention.

Having thus described my invention, I claim:

1. A valve stem comprising a body portion having an air passageway therethrough, the outer end of which is enlarged, means in said body portion dividing the enlarged outer end of said passageway into a plurality of passageways, an independent valve mechanism in each of said plurality of passageways and having the valve actuating pin thereof extending beyond the outer end of said body portion, a cap secured to the outer end of said body portion and having at its outer end a reduced nipple adapted to receive an inflating device, a disk in said cap and provided on its circumference with radially extending ears slidably supporting the disk in said cap, said disk normally engaging the outer ends of the actuating pins of said valve mechanisms, and a flat slab member carried by said disk and having a portion slidably supported in the reduced nipple of said cap and extending to the outer end thereof.

2. A valve stem adapted to be used with an inflatable article such as a pneumatic tire and comprising a body portion having a single air passageway therein for a portion of its length and adapted to be in communication with the interior of the article, said body portion also having a plurality of air passageways therein extending from the outer end of the body portion and in communication with said first named passageway, an independent valve mechanism in each of said plurality of passageways and having the valve actuating pin thereof extending beyond the outer end of said body portion, a cap secured to the outer end of said body portion and adapted to receive on its outer end an inflating device such as an air chuck, an actuator in said cap having a portion contacting the outer ends of the valve pins of said valve mechanisms and a portion arranged to cooperate with and be depressed by said inflating device, said actuator and said cap having cooperating portions slidably guiding the actuator in said cap.

3. A valve stem adapted to be used with an inflatable article such as a pneumatic tire and comprising a body portion having an air passageway therethrough adapted to be in communication with the interior of the article, the outer end of which passageway is enlarged, means in said body portion dividing the outer end of said passageway into a plurality of passageways, an independent valve mechanism in each of said plurality of passageways and having the valve actuating pin thereof extending beyond the outer end of said body portion, a cap secured to the outer end of said body portion and adapted to receive on its outer end an inflating device such as an air chuck, an actuator in said cap having a portion contacting the outer ends of the valve pins of said valve mechanisms and a portion arranged to cooperate with and be depressed by said inflating device, said actuator and said cap also having cooperating portions slidably guiding the actuator in said cap.

JOHN C. CROWLEY.